United States Patent [19]

Kercheval et al.

[11] 4,355,519
[45] Oct. 26, 1982

[54] SPLIT RING SEAL FOR CRYOGENIC REFRIGERATOR

[75] Inventors: John E. Kercheval, Wyland/Natick; Harry G. Nicoll, Norwell, both of Mass.

[73] Assignee: Helix Technology Corporation, Waltham, Mass.

[21] Appl. No.: 255,467

[22] Filed: Apr. 20, 1981

[51] Int. Cl.³ ............................................. F25B 9/00
[52] U.S. Cl. ....................................... 62/6; 277/198; 277/236
[58] Field of Search ..................... 62/6; 277/236, 198

[56] References Cited

U.S. PATENT DOCUMENTS 1,151,265 8/1915 Haggard ............................... 277/197
1,336,670 4/1920 Anderson ............................. 277/198
3,364,675 1/1968 Dorer ..................................... 62/6

OTHER PUBLICATIONS

"Engineer's Handbook; *Koppers Co. Inc.,* Nineth Edit. 1975.

*Primary Examiner*—Ronald C. Capossela
*Attorney, Agent, or Firm*—Hamilton, Brook, Smith and Reynolds

[57] ABSTRACT

A cryogenic refrigerator has a split seal at the interface between a displacer and cylinder. An expander ring presses the seal ring against the cylinder. The seal ring is also axially loaded against one face of a groove in which it is positioned. Preferred spring elements for axially loading the seal ring include a U-cross-section spring and a spring washer.

10 Claims, 4 Drawing Figures

SPLIT RING SEAL FOR CRYOGENIC REFRIGERATOR

DESCRIPTION

1. Technical Field

This invention relates to reciprocating cryogenic refrigerators and in particular to a split seal for use therein.

2. Background

In cryogenic refrigerators such as Stirling and Gifford-MacMahon type refrigerators, a piston-like displacer reciprocates within a cylinder. For efficient refrigeration in those two systems, a gas seal is provided between the displacer and cylinder to assure that refrigerant passing from one end of the displacer to the other passes through a regenerator in the displacer. The seal also provides a braking action on displacer movement. One type of seal which has been widely used in such refrigerators is the split ring seal having a Z-cut thereacross to permit circumferential expansion of the ring without loss of sealing. The seal is positioned in a circumferential groove in the displacer and is pressed outward against the cylinder by an inner expander ring. When assembled, the split seal fits snugly within the groove. A primary advantage of such a seal in cryogenic refrigerators is that, even with wear and thermal contraction or expansion of the seal, the expander assures a fairly constant braking force on the displacer movement.

However, with changes in the ambient temperature and with temperature changes from refrigerator operation, there is a loss of sealing action and stable operation of the refrigerator is often lost. Also, excessive wear of the split ring has been found.

An object of this invention is to provide, in a reciprocating cryogenic refrigerator, a split ring seal design which operates consistently over a wide range of ambient and operating temperatures. Further objects of this invention are to provide such a seal which is not subject to the same degree of wear as prior seals and which generally provides better sealing action for more efficient refrigeration.

DISCLOSURE OF THE INVENTION

In accordance with this invention, a split ring seal is provided in a reciprocating cryogenic refrigerator with means for exerting an axial spring force against the seal to press the seal ring against one face of a circumferential groove. Even with axial shrinkage of the seal ring, the applied load holds the seal against the groove wall to maintain continuous seals at the split in the seal ring and between the seal ring and the groove wall.

In a preferred embodiment, the force is applied by a spring element positioned between one face of an enlarged groove and a pressure ring. The pressure ring is shaped to press against the seal ring but not against the expander ring.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1:
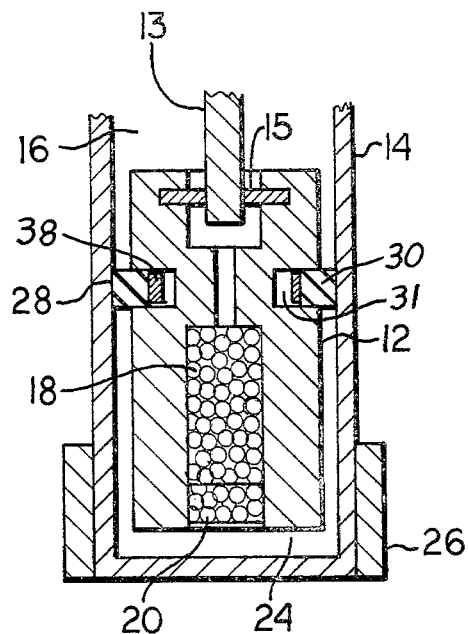
FIG. 1 is a cross sectional view of a cold finger of a typical cryogenic refrigerator in which this invention is employed.

As shown in FIG. 1, a typical split Stirling refrigerator includes a displacer 12 which reciprocates in a cylinder 14. The displacer is driven by a piston rod 13 through a pin connection 15. Upward movement of the displacer 12 causes high pressure gas in a warm chamber 16 to be displaced through a regenerator 18 within the displacer. The gas passes outward through a porous metal plug 20 into a cold end expansion chamber 24. The thus cooled gas is expanded in the chamber 24 to further cool the gas and a surrounding high conductivity heat station 26. Then, with downward movement of the displacer the very cold gas is returned through the regenerator 18 to cool that regenerator for cooling of gas in the next cycle of operation. To assure that all refrigerant, such as helium gas, is directed through the regenerator with movement of the displacer, a seal ring 28 is positioned in a peripheral groove in the displacer near its warm end.

Figure 2:
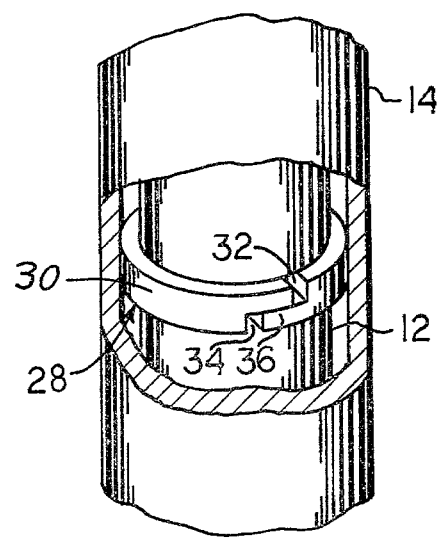
FIG. 2 is a perspective view of the displacer seal in FIG. 1 with the cold finger cylinder broken away.
Figure 3:
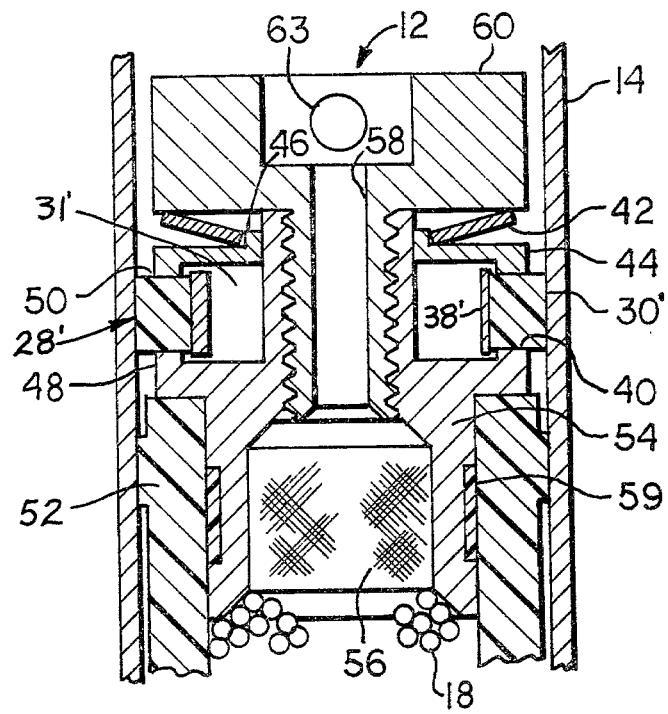
FIG. 3 is a longitudinal cross sectional view of a seal arrangement embodying this invention.

As shown in FIGS. 2 and 3, the seal 28 includes an outer seal ring 30 which fits within a groove 31 (FIG. 3) in the displacer. To permit expansion and contraction of the outer seal ring 30, particularly with changes in temperature, the ring is split along a Z-cut. That Z-cut includes two axial cuts 32 and 34 into the upper and lower surfaces of the ring 30. Those cuts are displaced along the periphery of the ring and are joined by a circumferential cut 36.

In conventional refrigerators, as shown in FIGS. 1 and 2, the seal ring 30 fits snugly within the groove and is pressed against one side of the groove in the displacer by a pressure differential or by friction between the seal and cylinder. The two ends of the ring 30 are thus pressed tightly together along the slit 36 to provide a gas seal at that slit; and there is an outer sealing surface 360 degrees around the seal ring.

The seal ring 30 is pressed outward against the cylinder 14 by an inner expander ring 38 of spring steel. Preferably, the expander ring is also split and is tapered toward the split. Such a split seal is described in a copending, co-assigned application to Harry G. Nicoll for Split Seals. Other forms of expanders may also be used.

The seal ring 30 is generally of plastic material such as fiber glass tetrafluoroethylene (TFE); whereas the expander ring is of spring steel and the groove is usually formed in stainless steel. Thus, the seal ring 30 has a much greater coefficient of thermal expansion than do the surrounding metal parts. To allow for thermal expansion of the seal ring within the groove, rings in conventional refrigerators have a slightly smaller axial dimension than that of the groove to within 0.5 mils. Thus, except when operating at high temperatures, the seal ring shuttles within the groove along the expander ring with each change in direction of the displacer movement. During the time intervals that the seal is shifting within the groove, there is no compressive force to maintain a tight seal along the circumferential cut 36 and at a groove face. Thus, leakage is experienced with each change in direction of the displacer. Also, the seal ring must alternately seal against opposite faces of the groove. For this the faces of the seal ring and the groove must be precisely smooth, flat and parallel. Such necessary precision, makes large scale fabrication of consistently and uniformly operating devices difficult.

When the refrigerator is exposed to a cold environment, or the seal is cooled by the refrigerator itself, the seal ring shrinks and, as a result, shuttles to a greater extent along the expander ring with each reciprocating movement of the displacer. Such shuttling of the seal within the groove results in greater wear and leakage. The wear of the seal ring leads to even greater leakage around the displacer and also gives rise to debris which, when mixed with the helium refrigerant, reduces the efficiency of the refrigerator.

In accordance with this invention, the seal 28' is positioned within a relatively large groove 31' and is held against one face 40 of that groove by a spring 42. In the embodiment of FIG. 3, this spring 42 is a frustoconical washer which presses against the seal 30' through a metal pressure ring 44. The spring 42 is centered about the pressure ring 44 by an axial flange 46 but if properly dimensioned will be centered without the need for the flange. The pressure ring 44 and the face of the groove against which the seal is pressed are each formed with a circular step 48, 50 so that they press against the seal ring but not against the expander ring.

In this particular embodiment, the displacer comprises a G10 fiber glass epoxy cylinder 52 filled with a regenerative material 18 such as nickel or lead antimony beads. This cylinder 52 is closed at its upper end by a stainless steel cap 54 having a micron filter plug therein. The sealing face and inner wall of the groove are formed in this cap 54. The cap and cylinder 52 are held together by epoxy 59.

The upper face of the groove is formed in a stainless steel end piece 60 which is connected to the cap 54 by a screw connection. A bore 58 allows for the flow of gas down through the micron filter 56 and regenerative material 18. A pin hole 63 is provided for the pin connection 15 of FIG. 1.

It can be seen that, even with thermal contraction of the seal 30, the spring 42 maintains axial spring force on the seal through the pressure ring 44 to keep the seal pressed firmly against the step 48. There is no shuttling of the seal and thus no resultant loss of sealing against a face of the groove. Also, with the seal in compression, the circumferential cut 36 in the split ring is kept closed and proper sealing action is maintained at that surface.

The spring must exert sufficient force to prevent any shuttling of the seal away from the step 48 with friction or pressure differentials, even with contraction of the seal. On the other hand, the spring 42 must not exert so great an axial force that it inhibits the radial expansion of the seal under the force of the expander 38; but in the case of a TFE seal operated at a high frequency this is not considered a problem. Further, the spring force should be substantially constant over the ranges of expected temperatures and resultant seal contractions at which the seal must operate.

In one example of the invention, a Belleville washer has been used to axially load a 0.185 inch outer diameter seal. The washer was formed from 0.004 inch thick stock of beryllium copper fully hardened. The free deflection height of the formed washer was 0.005 inch. Positioned against the pressure ring, the washer was deflected 0.001 to 0.002 inch.

Figure 4:
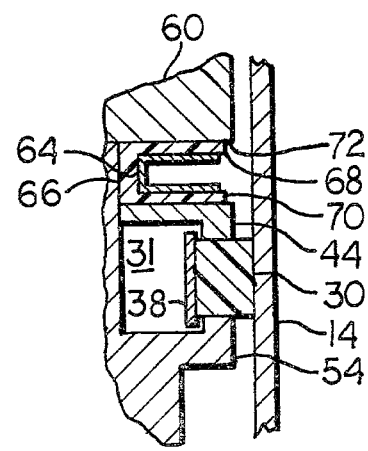
FIG. 4 is a partial cross-sectional view of a seal arrangement including a U-cross-section spring element.

FIG. 4 illustrates another spring element which may be used to load the split seal ring. In this case, a U-cross-section annular spring 64 is positioned within a U-cross-section annular casing 66. The casing may be of TFE. The legs 68, 70 of the spring element press against the face 72 of the groove and the pressure ring 44 to axially load the split seal 30.

Other preferred spring elements include a wavy washer and a coil spring. A less preferred but possible spring element would be an O-ring.

The axially loaded seal of this invention retains the advantages of conventional split ring seals. It has the further advantage of ease of fabrication because the relative size of the groove is not as critical as with conventional seals and because only one face of each of the seal and groove must be sufficiently flat and smooth for purposes of sealing. With dimensions and surface characteristics less critical, operating characteristics of refrigerators employing the seal arrangement are more uniformly reproducible in large volume manufacturing. Finally, because the seal ring is held against one face of the groove even with thermal contraction and expansion, the seal, and thus the refrigerator, is much less temperature sensitive.

While the invention has been particularly shown and described with reference to an illustrative embodiment thereof, it will be understood by those skilled in the art that various changes in form and details may be made therein without departing from the spirit and scope of the invention as defined by the appended claims. For example, the spring ring shown is an expander ring. If the seal were positioned in a groove in the cylinder 14 and were forced inward against the displacer 12, the spring would be outside the seal ring and would compress the seal ring. Also, the split in the seal ring may be other than the Z-cut shown. The refrigerator described has a regenerative displacer as the reciprocating element. The regenerator might have been external to the displacer. Further, the term displacer in the claims is used loosely to include piston-like elements in general which allow for the expansion of refrigeration gas at one end thereof. The term is thus intended to cover a piston such as in an expansion engine which does not make use of a regenerator.

We claim:

1. A refrigerator of the type comprising a displacer which reciprocates axially within a cylinder for expanding a refrigeration gas and a split seal positioned within a circumferential groove at the interface between the displacer and the cylinder, the seal having a split seal ring and a spring ring exerting a radial spring force on the seal ring, the split seal in the refrigerator characterized by:
   loading means for exerting an axial spring force against on axially directed face of the seal ring to press that ring against one face of the circumferential groove and maintain continuous seals at the split in the seal ring and at said face of the groove.

2. A refrigerator as claimed in claim 1 wherein the loading means is a U-cross-section, annular spring.

3. A refrigerator as claimed in claim 1 wherein the loading means is a spring washer.

4. A refrigerator as claimed in claim 1, 2 or 3 wherein the loading means presses against the seal ring through a pressure ring.

5. A refrigerator as claimed in claim 4 wherein the pressure ring includes a step which contacts the seal ring but which avoids contact with the spring ring.

6. A refrigerator as claimed in claim 1, 2 or 3 wherein the circumferential groove is in the displacer and the spring ring is an expander.

7. A refrigerator of the type comprising a displacer which reciprocates axially within a cylinder and a split seal positioned within a circumferential groove in the displacer at the interface between the displacer and the cylinder, the seal having a seal ring, split in a manner to permit circumferential expansion and contraction of the seal ring while maintaining a 360 degree sealing surface, and an expander ring for applying a radial spring force on the seal ring, the split seal characterized by:

loading means for exerting an axial spring force against one axially directed face of the seal ring but not the expander to press the seal ring against one face of the circumferential groove and maintain continuous seals at the split in the seal ring and at said face of the groove.

8. A seal as claimed in claim 7 wherein the loading means is a U-cross-section annular spring.

9. A refrigerator as claimed in claim 8 wherein the spring presses against the seal ring through a pressure ring.

10. A refrigerator as claimed in claim 9 wherein the pressure ring includes a step which contacts the seal ring but which avoids contact with the spring ring.

* * * * *